United States Patent [19]

Swanson

[11] Patent Number: 4,500,805
[45] Date of Patent: Feb. 19, 1985

[54] ELECTROMECHANICAL LINEAR ACTUATOR

[75] Inventor: Richard G. Swanson, West Hartford, Conn.

[73] Assignee: Esco Design, Inc., West Hartford, Conn.

[21] Appl. No.: 577,864

[22] Filed: Feb. 7, 1984

[51] Int. Cl.³ .................................. H02K 7/06
[52] U.S. Cl. .................................. 310/80; 310/83; 310/75 R
[58] Field of Search .................. 310/80–90, 310/112, 75

[56] References Cited

U.S. PATENT DOCUMENTS

| | | | |
|---|---|---|---|
| 2,366,739 | 1/1945 | McCoy | 310/83 UX |
| 2,444,886 | 7/1948 | Vickers | 310/83 UX |
| 2,446,393 | 8/1948 | Russell | 310/83 UX |
| 2,479,019 | 8/1949 | Ochtman | 310/83 UX |
| 2,769,430 | 11/1956 | Geyer | 310/83 UX |
| 3,402,308 | 9/1968 | Henschke | 310/80 |
| 3,660,704 | 5/1972 | Paine | 310/80 |
| 3,898,399 | 8/1975 | Yasui et al. | 310/80 X |
| 3,987,323 | 10/1976 | Hess | 310/80 |

Primary Examiner—Donovan F. Duggan
Attorney, Agent, or Firm—McCormick, Paulding & Huber

[57] ABSTRACT

An electromechanical linear actuator comprises an electric motor driving a cog belt and pulley device in turn rotating a lead screw of the ball type. The lead screw is restrained axially and rotates a drive nut which moves axially along the screw in one and an opposite direction. The drive nut in turn moves an actuator assembly comprising a drive ring, four (4) circumaxially spaced rods, and an actuating head connected at a remote end of the rods.

10 Claims, 2 Drawing Figures

ELECTROMECHANICAL LINEAR ACTUATOR

BACKGROUND OF THE INVENTION

Electromechanical linear actuators comprising an electric motor driving a lead screw which in turn positions an actuating member have been available in the past. Such actuators, however, have not been wholly satisfactory particularly when a long stroke or long axial extension of an actuating member is required. Generally, the lead screws are cantilevered with the actuating member having a hollow cylindrical configuration thereabout, a construction somewhat lacking in rigidity and durability in long stroke operation.

It is the general object of the present invention to provide an improved electromechanical linear actuator which is particularly well suited to long stroke operation.

SUMMARY OF THE INVENTION

In fulfillment of the aforementioned object, an electromechanical linear actuator is provided with an electric motor having a source of electrical power and a rotary mechanical output element. A rotary mechanical motion transmission means connectable with the motor output element is operated thereby and in unison therewith. An elongated housing has one end portion open and in communication with the motion transmission means and an opposite end portion of the housing remote therefrom. An elongated lead screw disposed within the housing has one end portion at said one end portion of the housing in operative connection with and rotatably driven by the motion transmission means. First and second axially spaced bearing means in the housing are disposed respectively at said one and opposite end portions thereof to support the lead screw for rotation by the motion transmission means. Means retaining the lead screw against axial movement relative to the bearing means is provided and a drive nut is operatively associated with and about the lead screw for axial movement therealong in one and an opposite direction in response to rotation of the screw in one and an opposite direction.

An actuator assembly telescopically received within the housing at its said opposite end portion is movable linearly relative thereto in one and an opposite direction for projection from said opposite end portion in varying degree. The actuator is operatively connected with and driven axially by the drive nut and comprises a plurality of similar elongated actuating rods which are circumaxially arranged about the lead screw within the housing and which have an actuating head connected therewith at end portions thereof adjacent said opposite end portion of the housing. The actuating rods are entered in suitable apertures in a guide and closure member at the opposite end portion of the housing for the telescopic movement of the rods relative to the housing. Said guide and closure member also serves to mount the aforesaid second bearing means at the said opposite end portion of the housing for control and restraint of lead screw rotation in a radial direction and for a high degree of efficiency and durability in lead screw and drive nut operation.

DESCRIPTION OF THE PREFERRED EMBODIMENT

Figures 1, 2:
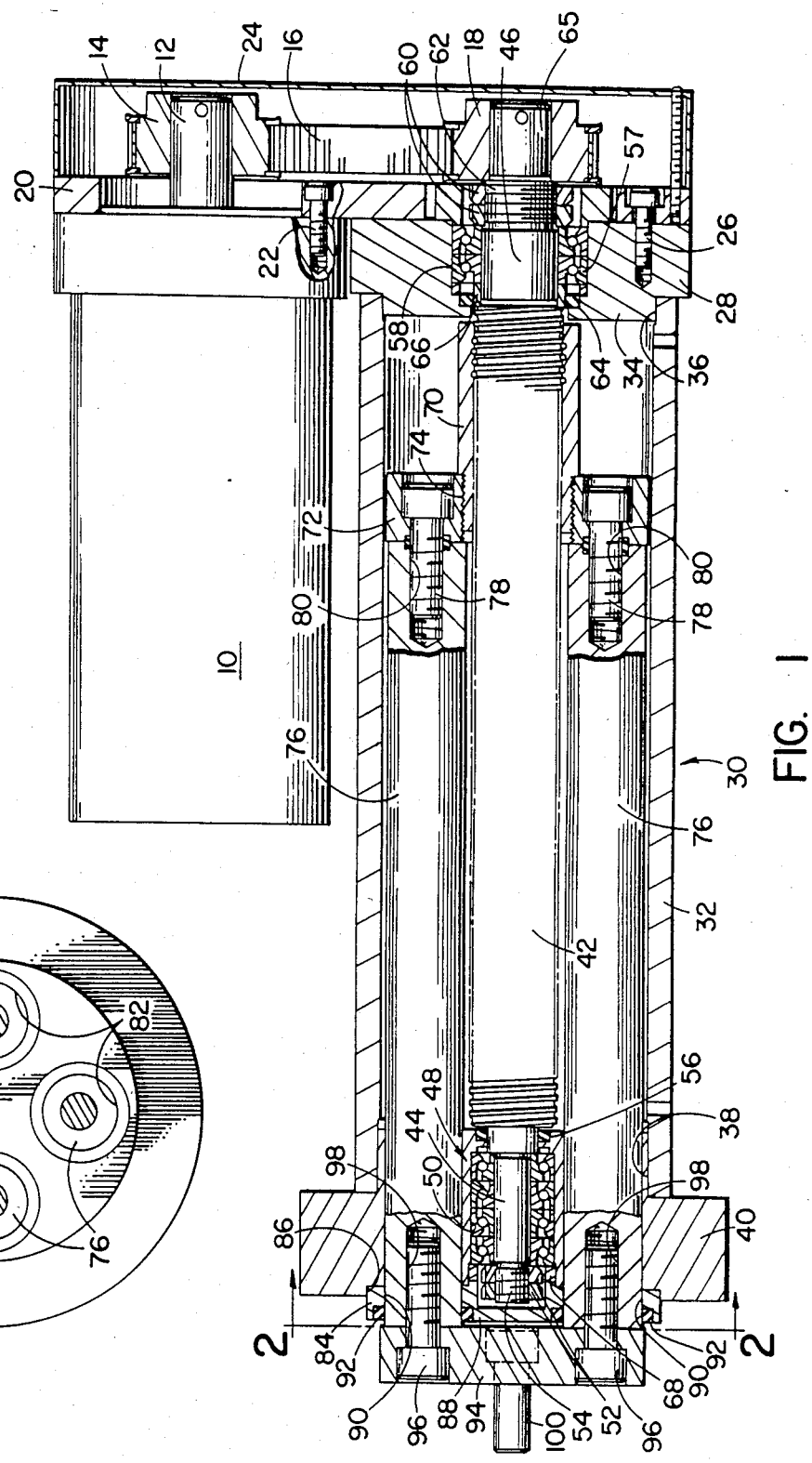
FIG. 1 is a sectional view showing the improved electromechanical linear actuator of the present invention.
FIG. 2 is a section taken through FIG. 1 as indicated generally at 2—2 in FIG. 1.

Referring particularly to FIG. 1, an A.C. or D.C electric motor indicated generally at 10 is adapted for connection with a source of electrical power and has a rotary mechanical output element or shaft 12. The shaft 12 is connectable with a rotary mechanical motion transmission means in the form of a cog pulley 14 cog belt 16 engaged thereover and a second cog pulley 18 driven by the belt 16. The motor 10 may be mounted on a plate 20 as by means of bolts 22,22 one shown, and a housing member 24 encloses the rotary transmission means or cog belt-pulley arrangement in cooperation with the plate 20. The plate 20 may also be attached, as by means of a bolt 26 to a first or rear end cap 28 forming a part of actuator housing 30. The housing 30 may vary widely in form but preferably comprises a hollow cylindrical member 32 which is elongated and which receives a reduced diameter inner end portion 34 of the cap 28 at the righthand or first end portion thereof 36.

As shown in FIG. 1, housing 32 extends leftwardly from the end cap 28 to an opposite end portion 38 and to a second or front cap or closure member 40. The front cap 40 serves as a guide member for an improved actuating means of the present invention and also mounts a front bearing assembly for a lead screw 42 as will be more fully described hereinbelow.

Lead screw 42 is elongated and is preferably of the ball type as illustrated with reduced diameter front and rear end portions 44 and 46. The reduced diameter front end portion 44 is journaled in bearing assembly 48 in turn mounted in a central opening 50 in the end cap 40. Retaining nuts 52,52 are provided at a threaded end portion 54 of the lead screw and an annular seal is provided at 56.

Reduced diameter rear end portion 46 of the lead screw 42 is journaled in a bearing assembly 57 mounted in a central aperture 58 in the rear end cap 28. Retaining nuts 60,60 cooperate with a threaded portion 62 of the lead screw to secure the screw and bearing assembly in position and an annular seal is provided at 64 for sealing of a lubricant between the seals 56 and 64 and about the lead screw 42 within the cylindrical housing member 32.

The aforementioned cog pulley 18 is fixed to a further diametrically reduced rear end portion 65 of the lead screw 42 and it will be apparent that the screw 42 is rotated by the rotary transmission means or cog belt-pulley arrangement 14, 16, 18 on rotation of the motor output shaft 12. With the lead screw 42 restrained against axial movement by small thrust ring 66, retaining nuts 60,60 thrust ring 68, and the retaining nuts 52,52, it is apparent that rotation of the screw 42 will serve to move a complimentary drive nut 70 axially therealong.

Drive nut 70 is preferably of the ball type and is mounted on and about the lead screw 42 for movement axially therealong in one and an opposite direction on rotation of the lead screw in one and an opposite direction. Operatively associated with the drive nut 70 is a rear drive member or drive ring 72 which may be threadedly engaged with the nut 70 as at 74 for axial movement therewith and which serves to support rear end portions of a plurality of actuating rods 76,76. The actuating rods 76,76 are elongated and are arranged circumaxially about the lead screw 42 within the housing member 32. Preferably, and as best illustrated in FIG. 2 four (4) rods 76,76 are provided with the rods equally spaced circumaxially about the lead screw 42. Connection between the rear drive ring 72 and the rods 76,76 may be effected as shown with bolts 78,78 entered axially through the ring 72 and threadedly engaged in suitable openings 80,80 in rear portions of the rods 76,76.

At opposite or front end portions, the rods 76,76 are supported and guided by the aforementioned cap or closure member 40. More specifically, the cap or closure member 40 at the front end of the actuator housing 30 is provided with four (4) equally spaced cylindrical openings 82,82 for telescopically receiving and guiding the rods 76,76 respectively. Thus, the rods are telescopically received within the housing 30 and slide axially through the openings 82,82 in the front end cap 40 so as to be firmly supported and guided in a relatively long stroke or long axial extension of the rods. Further, the front end portion of the lead screw 42 is firmly supported for rotation as stated by the bearing assembly 48 mounted within the cap member 40, the said cap or closure member thus serving a dual function.

The cap member 40 also has associated therewith a secondary or auxiliary cap member 84 which is received in an opening 86 and closes axial opening 50 in the cap or closure member 40 and which in turn secures the bearing assembly 48 in position. Further, the secondary or auxiliary cap 84 is provided with aligned openings 90,90 for the rods 76,76 and annular sealing members 92,92 are secured about the rods in small annular grooves adjacent the openings 90,90.

An actuating head 94 is preferably also provided at a front end portion of the actuating rods 76,76. The head or plate 94 may be secured to the actuating rods 76,76 respectively by means of bolts 96,96 passing through the plate and threadably engaged in suitable openings 98,98 in the rods. A forwardly projecting mounting bolt 100 may also be provided in the plate or actuating head 94 as illustrated.

As will be apparent from the foregoing, the actuator of the present invention provides for a high degree of rigidity and efficiency in long stroke operation. The front end portion of the lead screw 42 is firmly supported for rotation and the rods 76,76 are securely guided by the front end cap 40 of the housing. Thus, neither the lead screw nor the actuator is cantilevered and the actuator is not only efficient and accurate in use but shows a high degree of durability and long service life.

I claim:

1. An electromechanical linear actuator comprising an electric motor adapted for connection with a source of electrical power and having a rotary mechanical output element, rotary mechanical motion transmission means connectable with the electric motor output element and operated thereby and in unison therewith, an elongated housing having one end portion open and in communication with said motor transmission means and an opposite end portion remote therefrom, an elongated lead screw disposed within said housing and having one end portion at said one end portion of the housing in operative connection with and rotatably driven by said motion transmission means, first and second bearing means in said housing respectively at said one and opposite end portions thereof supporting said lead screw for rotation by said motion transmission means, means retaining said lead screw against axial movement relative to said bearing means and housing, a drive nut operatively associated with and about said lead screw for axial movement therealong in one and an opposite direction in response to rotation of the screw in one and an opposite direction, and an actuator assembly telescopically received within said housing at its said opposite end portion and movable linearly relative thereto in one and an opposite direction for projection from said opposite end portion in varying degree, said actuator being operatively connected with and driven by said drive nut and comprising a plurality of similar elongated acutating rods circumaxially arranged about said lead screw within said housing and an actuating head connected with each of said rods at end portions thereof adjacent said opposite end portion of the housing.

2. An electromechanical linear actuator as set forth in claim 1 wherein said actuating rods also have operatively associated therewith a drive member connected with and movable axially with said drive nut.

3. An electromechanical linear actuator as set forth in claim 2 wherein said drive member is slidably received within said housing and connected with said actuating rods at end portions thereof opposite said actuating head.

4. An electromechanical linear actuator as set forth in claim 3 wherein said housing is of hollow cylindrical configuration and said drive member takes the form of a cylindrical plate having a peripheral surface slidable along the interior cylindrical surface of the housing and having a radially inwardly disposed portion connected with said drive nut.

5. An electromechanical linear actuator as set forth in claim 1 wherein said housing includes a rod guide and closure member at its said opposite end portion, said member being apertured respectively for slidably receiving and guiding said actuating rods in their telescopic movement relative to said housing.

6. An electromechanical linear actuator as set forth in claim 5 wherein said drive nut is connected with said rods at an end portion opposite said actuating head.

7. An electromechanical linear actuator as set forth in claim 6 wherein at least two (2) actuating rods are provided and are equally circumaxially spaced about said lead screw.

8. An electromechanical linear actuator as set forth in claim 6 wherein said motion transmission means connected between said electric motor and said lead screw comprises a cog belt-pulley mechanism.

9. An electromechanical linear actuator as set forth in claim 8 wherein said electric motor output element and said one end portion of said lead screw are arranged contiguously with said motor and housing extending in the same direction therefrom.

10. An electromechanical linear actuator as set forth in claim 1 wherein said lead screw and drive nut are of the ball type.

* * * * *